United States Patent Office 3,367,981
Patented Feb. 6, 1968

3,367,981
PHENOL ALKYLATION PROCESS
John P. Napolitano, Royal Oak, Mich., assignor to Ethyl Corporation, New York, N.Y., a corporation of Virginia
No Drawing. Filed May 10, 1963, Ser. No. 279,624
6 Claims. (Cl. 260—624)

ABSTRACT OF THE DISCLOSURE

Phenols are preferentially alkylated in the ortho position by the reaction of a phenol having at least one ortho position unsubstituted with an unsaturated hydrocarbon in the presence of a transitional alumina.

This process relates to an improved method of introducing organic groups onto the nuclear ring of phenols. More particularly this invention relates to the introduction of organic groups onto the aromatic ring of phenols in a position ortho to the OH group by utilizing a transitional alumina as a catalyst.

Substituents have been introduced onto the ring of aromatic compound in a number of ways. One known method is Friedel-Crafts alkylation whereby an aromatic compound is reacted with a halogenated aliphatic hydrocarbon in the presence of aluminum chloride, for example. By this method one or more alkyl groups are introduced at various positions on the ring. One difficulty experienced when using this process is that the alklylation is non-specific in that a distribution of the various alkylated isomers is obtained. In the case of phenol, for example, the activating influence of the sole hydroxyl group renders the ortho and para positions active in different degrees, and in general the para position is the more active. Para substitution, therefore, predominates over substitution in the ortho position. Another difficulty experienced with Friedel-Crafts alkylation is the rearrangement of the carbon skeleton when branched chain hydrocarbons are introduced. Also, cleavage of highly branched chain hydrocarbons often occurs. When groups other than alkyl are desired on the aromatic ring, a round-about method of synthesis must be resorted to.

In U.S. Patent No. 2,831,898 a process is disclosed and claimed for selectively introducing hydrocarbon groups onto the nuclear ring of a phenol using, as a catalyst an aluminum phenoxide. This method solved the problem of selectively introducing groups onto the aromatic ring of phenol. However, a drawback to this process is that complicated separation procedures must be employed to free the product of the catalyst. After reaction the catalyst is highly soluble in the product. The product must be taken up in a solvent, hydrolyzed with a dilute acid such as dilute HCl to convert the catalyst, washed with water to neutrality, thereby removing the aluminum catalyst as a salt, and finally stripped of solvent.

In U.S. Patent No. 2,923,745 a rather involved process for ortho-alkylating phenols using aluminum chloride as a catalyst is disclosed. During this procedure a substantial amount of the aluminum chloride combines with phenol to form an aluminum phenoxide. This process therefore also suffers serious drawbacks since it too requires complicated separation procedures to free the product of the catalyst.

It is, therefore, an object of this invention to provide an improved process for the introduction of organic groups onto the nuclear ring of phenols with a minimum of work-up and purification requirements. It is a further object of this invention to provide such an improved process comprising reacting a phenol with a compound possessing one or more units of carbon to carbon unsaturation using, as a catalyst, a transitional alumina.

Applicant's invention results from his discovery that transitional aluminas have the unexpected and unobvious property of affording the selective introduction of organic group into the ortho positions of a phenol. Further, such aluminas can be readily separated from the product by simple filtration leaving the product essentially free from catalyst contaminants. Another advantage of the process of this invention is that a higher proportion of mono-ortho alkylated product is obtained than with previous processes. Such phenols are valuable as intermediates and antiseptics.

One of the most striking and unusual features of this invention is the critical nature of the alumina which is employed as a catalyst. The broad spectrum of aluminas, in general, cannot be used indiscriminately. Only certain highly select and specific types of alumina are useful. The aluminas which are used as catalysts in this invention can be described as "transitional" aluminas. They are metastable forms which, in general, are produced by heating of alpha or beta alumina trihydrates or of alpha alumina monohydrate. As each of these starting materials, or any mixture thereof, is heated, phase changes take place. A number of intermediate or transitional alumina phases are formed. These are characterized by being only partially or poorly crystalline. They are partly amorphous and partly crystalline. Formation of these phases is reversible, i.e., on rehydration, they can be converted back to the starting-materials. On prolonged heating, particularly at very high temperatures such as 1150° C., they are converted to the so-called "alpha alumina" which is a stable, refractory type of alumina not applicable to this invention. Conversion of the transitional forms of alumina to the alpha form is irreversible and any substantial conversion to this form is to be avoided in the preparation of alumina catalysts of this invention.

In the overall transition between the alumina trihydrates and alpha alumina, several different transitional aluminas are prepared, either simultaneously or concurrently. Some of these transitional phases are convertible to others upon appropriate heating or cooling. Any of these transitional aluminas can be used as catalysts in this invention, but as will be described, certain forms are preferred.

According to the nomenclature used in the pamphlet "Alumina Properties," Russell et al., published by the Aluminum Company of America, Pittsburgh, Pa., 1956; the names assigned to the various transitional aluminas are gamma, delta, eta, theta, kappa, chi and rho. All these are useful as catalysts in this invention. In addition, the alpha monohydrate itself is in a sense a transitional alumina, since it is a product reversibly obtained on heating of either alpha or beta alumina trihydrate under suitable conditions of temperature and time. The alpha monohydrate is useful as an alumina catalyst of this invention. In addition to the transitional forms described above, there is a truly amorphous alumina which is characterized by having no definite X-ray diffraction pattern. This amorphous material is often present along with the transitional aluminas of this invention and for purposes of this invention is included among them.

Any of the transitional aluminas mentioned above can be used singly as a catalyst in this invention. In this respect it is preferred to use gamma alumina. It is also preferred to use mixtures of two or more of the transitional aluminas including mixtures of as many as nine. In most preparations of catalyst a mixture of at least two, and often more than two, is perforce formed. In this respect it is preferred to use a transitional alumina comprising a mixture of from 10 to 90 percent alpha alumina monohydrate and from 10 to 90 percent eta alumina.

It appears not possible to describe each transitional alumina in terms of its specific physical properties, other than those mentioned above. Many can be characterized by their X-ray diffraction pattern. Several of these are reproduced on Page 28 of the pamphlet referred to above.

It is likewise not possible to ascribe definite procedures to preparation of all of the transitional aluminas of this invention. Conversion of the starting materials—alpha and beta aluminum trihydrates and alpha alumina monohydrate—to one or more of the transitional aluminas of the invention, as well as conversion of one transitional alumina to another is a function of both time and temperature. Heating to a high temperature for a short time can result in a mixture of transitional aluminas having the same composition as is produced by heating the same starting mixture of ingredients to a lesser temperature for a longer time. Generally speaking, alpha alumina trihydrate is converted to the alpha monohydrate at about 140° C. in air or superheated steam and at about 100° C. in vacuum. Beta alumina trihydrate appears to be readily converted to the alpha monohydrate at about 120–160° C. Heating of the alpha trihydrate to about 140° C. for one hour results in some conversion to the chi transitional form. The chi form, in turn, goes over to some extent to the kappa transitional alumina when heated to 500° C. for one hour. Heating of the alpha monohydrate for one hour at 250° C. gives some gamma, which on heating at 850° C. for the same length of time produces some theta transitional alumina, with possible intermediate conversion to delta. Heating of the beta trihydrate to 140° C., in addition to producing some alpha monohydrate, also produces some of the eta activated form. This in turn goes over to theta on heating at 450° C. Particular procedures for some of the aluminas will be found in the examples.

The kappa and theta forms are converted to the alpha alumina, not useful in this invention, on heating to 1150° C. for one hour.

In general then, the transitional aluminas used in this invention are prepared by heating a starting alumina selected from the class consisting of alpha alumina trihydrate, beta aluminum trihydrate and alpha alumina monohydrate to a temperature of at least 100–150° C. for a period of time sufficient to permit substantial conversion to a transitional alumina but insufficient to convert a substantial fraction of the transition aluminas irreversibly to the inactive alpha alumina. In general, prolonged heating above about 1000° C. should be avoided. The catalysts of this invention in some cases may contain small amounts of either the starting material or alpha aluminas, or both.

Certain aluminas meeting the requisites of this invention are commercially available. Included in these are those sold by the Aluminum Company of America as "Desiccant Grade Active Aluminas; Grades F–1, F–3 and F–10" and by Kaiser Aluminum Company as "KA–101." Chemical analyses of typical aluminas of this invention are: 85.0–95.4 percent of $Al_2O_3$, 0.4–2.0 percent of $Na_2O$, 0.02–0.15 percent of $Fe_2O_3$, 0.02–5 percent of $SiO_2$ and loss on ignition at 1100° C. of 4.2–8.5 percent.

The phenols that can be used in our process can be mono- or poly-nuclear, and also mono- or poly-hydroxy, as for example, hydroxy benzenes, hydroxy anthracenes, hydroxy naphthalenes, hydroxy phenanthrenes, and the like. The phenol used can also have other substituents on the aromatic ring. Illustrative examples of such phenols are given hereinbelow. Of the various phenols, it is preferred to utilize those possessing one, two or three condensed rings in the nuclear portion of the molecule. In particular, it is preferred to use hydroxy benzenes as one of the reactants.

The unsaturated compound which is reacted with the phenol can be an acetylene, substituted acetylene, mono- or poly-olefins, (including mixtures of olefins), cyclo-olefins, aryl substituted olefins, and halogen substituted olefins. Other compounds bearing carbon-to-carbon double or triple bonds that can be used are unsaturated alcohols, amines, esters, ethers, and the like. We prefer to use organic compounds possessing carbon-to-carbon unsaturation having from two to about twenty carbon atoms. Of the various possible unsaturated compounds it is preferred to use acetylenic and olefinic hydrocarbons. Of the olefins, those of lower molecular weight are preferred, as for example, ethylene, propylene, the various butylenes, and the like, up to olefins containing about twelve carbon atoms such as dodecene, although olefins of higher molecular weight up to and including those containing about twenty carbon atoms such as eicosene can also be used.

Particularly preferred olefins are beta-hydrogen alpha olefins having from 2 to 4 carbon atoms such as ethylene, propylene and α-butylene. These olefins are particularly preferred since yields are generally higher and the reaction smoother with such olefins.

The amount of catalyst used is dependent to some extent upon the pressure at which the reaction is conducted, the reactivity of the reagents and the activity of the catalyst. At higher pressures smaller amounts of catalysts can be used than are preferable at lower temperatures. Generally, the amount of catalyst used should be between about 0.1 and 30 percent by weight of the amount of phenolic reagent used. It is preferred to employ from 0.5 to 10 percent of catalyst based on the weight of the phenol used as it is found that this amount of catalyst produces a satisfactory rate of reaction. However, greater amounts of catalyst can be used.

A class of compounds synthesized by utilizing the present process has the formula

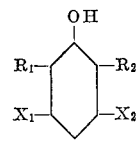

where $R_1$ and $R_2$ can be the same or different and can be halogenated hydrocarbon groups containing two or more carbon atoms; or they can be secondary or tertiary alkyl or cycloalkyl groups which can have aryl substituents, or cyclo- or substituted cyclo-aliphatic groups thereon, wherein the total number of carbon atoms in each R group is not less than eight. The X's can be the same or different and can be hydrogen, halogen, —OR, —$NH_2$, —$NO_2$ and —COOR', where $R_2$ is a hydrocarbon group containing from 1 to about 20 carbon atoms. Compounds of this class, having secondary or tertiary groups of the kind described herein in the two positions ortho to the hydroxy group, have superior germicidal and insecticidal properties. Also, because of their vastly increased solubility they serve as superior antioxidants in hydrocarbon fuel and lubricants, as well as antioxidants for rubber compositions. Another use of this class of compounds is as plasticizers and resin ingredients. Compounds can be prepared by reacting a phenol with an organic compound possessing carbon-to-carbon unsaturation using a transitional alumina catalyst. Illustrative examples of the product compounds of this class are: 2,6-di-(2-octyl)phenol obtained by the reaction of phenol with 1-octene and using eta alumina as a catalyst, 2,6-di-(2-dodecyl)-3-chlorophenol obtained by the reaction of 3-chlorophenol with 1-dodecene and using a gamma alumina catalyst, 2-(2-octyl) - 6 - (2-decyl)-3-chlorophenol obtained by first reactiong 3-chlorophenol with 1-octene using a theta alumina catalyst to produce 2-(2-octyl)-3-chlorophenol which is then reacted with 1-decene using a rho alumina.

Another class of compounds synthesized by the process of this invention has the formula

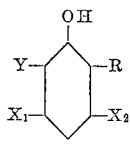

where Y is a halogen and R is an ethyl group or a secondary or tertiary hydrocarbon group having from 3 to about 20 carbon atoms which may or may not have a halogen substituent thereon. The X's can be the same or different and can be hydrogen, halogen, —OR, —NH$_2$, —NO$_2$ and —COOR', where R' is the hydrocarbon group containing from 1 to about 20 carbon atoms. The compounds can be prepared by reacting an ortho halo phenol which may or may not have other substituents in the 3 and 5 positions with an organic compound possessing carbon-to-carbon unsaturation. The compounds of this class are found to have enhanced germicidal activity as well as being very good insecticides. These compounds are also found to be very good antioxidants for gasolines and other hydrocarbon fuels as well asf or lubricating oils. the outstanding properties of the compounds of this class make them suitable for use as resin components, plasticizers, and as plasticizers, and as polymer ingredients. Illustrative examples of the product compounds of thos class are: 2-ethyl-6-chlorophenol obtained by the reaction of o-chlorophenol with ethylene and using a chi alumina catalyst, 2-bromo-6-isopropylphenol obtained by the reaction of o-bromophenol with propylene and using a kappa alumina catalyst, 2-tert-butyl-3-methoxy-6-chlorophenol obtained by the reaction of 3-methoxy-6-chlorophenol with isobutylene and using an alpha alumina monohydrate catalyst.

Still another class of compounds which is obtained by the present process has the formula

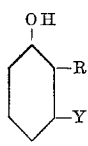

where Y is a halogen such as chlorine, fluorine, bromine or iodine and R is an ethyl group, or a secondary or tertiary hydrocarbon group having from 3 to about 20 carbon atoms. The compounds of this class can be prepared by reacting m-halo phenols such as m-chlorophenol, m-bromophenol, m-iodophenol or m-fluorophenol with a hydrocarbon possessing carbon-to-carbon olefinic unsaturation. Compounds of this class are found to have enhanced germicidal activity as well as being very good insecticides. These compounds are also found to be very good antioxidants for gasolines and other hydrocarbon fuels as well as for lubricating oils. The outstanding properties of the compounds of this class make them suitable for use as resin components, plasticizers and polymer ingredients. Illustrative examples of the product compounds of this class are: 2-ethyl-3-chlorophenol obtained by the reaction of m-chlorophenol with ethylene and using a mixture of gamma alumina and alpha alumina monohydrate, 2-isopropyl-3-bromophenol obtained by the reaction of m-bromophenol with propylene and using a mixture of eta alumina and alpha alumina monohydrate, 2-(2-octyl)-3-fluorophenol obtained by the reaction of m-fluorophenol with octene-1 and using a mixture of chi, rho and theta aluminas, 2-(2-eicosyl) 3-chlorophenol obtained by the reaction of eicosene-1 with m-chlorophenol and using a mixture of delta and kappa aluminas.

Various polymeric substances can be prepared by the process of this invention by reacting phenols substituted with organic groups possessing carbon-to-carbon unsaturation in the presence of a catalyst of the type described hereinbefore. For example, when anol,

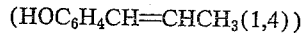

is reacted with itself in the presence of a transitional alumina, ortho substitution of the anol occurs and the process of such substitution can continue until two, three or more molecules of anol have been condensed to form one unit. The result is a polymer possessing novel and interesting properties. Non-limiting examples of phenols that can be polymerized in this manner are anol, eugenol, (HOC$_6$H$_3$(OCH$_3$)CH$_2$CH=CH$_2$(1,2,4)), isoeugenol and the like.

In addition to polymers of the above kinds, it in also possible to obtain polymers by the reaction of phenols with acetylenes and acetylenic compounds. An illustrative example is the reaction of phenol with acetylene and using transitional alumina catalyst. In this case the acetylene reacts with the phenol to form o-hydroxy styrene which then can react further with another molecule of phenol to form 1,1-di-(2-hydroxy phenyl)ethane. This product can further react with another molecule of acetylene followed by another molecule of phenol, and so on, to form a linear polymer chain.

In general, the process of our invention is carried out by reacting a phenol, such as hydroxy benzene, with an organic group possessing carbon-to-carbon unsaturation, such as ethylene, using a transitional alumina, as defined above, as a catalyst. When an olefin is used, the process can be referred to as an alkylation process, and when ethylene is the alkylating agent, the reaction should be conducted at elevated pressures in order to obtain a sufficient concentration of the gaseous reactant to produce a practical rate of reaction. The reaction temperatures can be from 100 to about 400° C. with reaction times of a half hour to several days or more. In general the higher range of temperatures, of from 200 to 500° C. are preferred when reacting a beta-hydrogen alpha olefin, much as ethylene, propylene and butylene, with reaction times of from one to 10 hours.

*Example 1*

KA–101 activated transitional alumina (sold commercially by the Kaiser Aluminum Company) was used as the catalyst. This transitional alumina has about 95.4 weight percent Al$_2$O$_3$, about 0.02 percent SiO$_2$, about 0.02 percent Fe$_2$O$_3$, about 0.002 percent TiO$_2$ and 0.40 percent Na$_2$O. On ignition it loses about 4.2 percent of its weight. It is prepared by the carefully controlled calcination of beta trihydrate and its principal constituents are eta alumina and alpha monohydrate.

A pressure resistant vessel having a removable cap for charging and discharging liquids and solids equipped with a plurality of gas inlet and outlet lines, temperature measuring means, pressure determining means, stirrer and nitrogen source was flushed with nitrogen and charged with a mixture of 100.0 grams of the above KA–101 catalyst, 454.0 grams of phenol and 180 ml. of propylene. The reaction vessel was heated to 314° C. over a period of 1.3 hours with a resultant pressure of 900 p.s.i.g. at which point reaction started and the pressure dropped to 500 p.s.i.g. in about 2 hours. An additional 452 ml. of propylene were added at 310 to 312° C. and 500 p.s.i.g. over a period of 1.75 hours. The reaction mass was cooled and filtered. A sample of the filtrate was analyzed by Vapor Phase Chromatography and revealed a yield of 63.3 percent 2-isopropyl phenol and 5.3 percent of 2,6-diisopropyl phenol.

*Example 2*

Gamma alumina is prepared by precipitating hydrated aluminum oxide from an aqueous solution of aluminum nitrate with ammonia, drying the precipitate, freeing the salt at 150° C. and heating it in a current of air for five hour at 450° C.

The reaction vessel of Example 1 is flushed with nitrogen and charged with a mixture of 94.6 gms. of the above gamma alumina catalyst, 454.0 gms. of phenol and 180 ml. of propylene. The mixture is heated to 280° C. with 820 p.s.i.g. for one hour. An additional 220 ml. of propylene are added in 1.5 hours. The mixture is then cooked at 295° C. for two hours and then cooled. The reaction mass is then filtered and the filtrate contains predominately 2-isopropyl phenol along with a small amount of 2,6-diisopropyl phenol.

Further good results are obtained with a minimum of reaction time when other phenols are reacted with propylene or other organic compounds possessing carbon-to-carbon unsaturation. For example, o-chlorophenol can be reacted with isobutylene using a KA-101 alumina catalyst to form 2-tert-butyl-6-chlorophenol in good yield. Likewise, m-chlorophenol can be reacted with butene-1 using a gamma alumina catalyst to give 2-(2-butyl)-3-chlorophenol and 2-(2-butyl)-5-chlorophenol with a minimum of separation procedures. Likewise 3,5-dimethylphenol can be reacted with allyl amine using a delta alumina catalyst to produce 2-(1-methyl-2-aminoethyl)-3,5-dimethylphenol which is easily isolated. Also naphthyl-1 can be reacted with ethylene using a mixture of chi and rho aluminas to give 2-ethylnaphthyl-1. Another example is the reaction of anthrol-1 with propylene using a mixture of theta, kappa and alpha monohydrate aluminas to form 2-isopropyl anthrol-1 in good yield at substantial savings in separation time. Other examples of products that can be formed by this process will be apparent to one skilled in the art.

Example 3

A mixture of 0.3 part of F-1 grade alumina and 300 parts of phenol were charged along with 180 parts of cyclohexane, as a solvent, to a pressure resistant vessel having a removable cap for charging and discharging liquids and solids equipped with a plurality of gas inlet and outlet lines, temperature measuring means, pressure determining means, stirrer and a nitrogen source.

The F-1 transitional alumina has about 92 percent $Al_2O_3$, about 0.8 percent $Na_2O$, about 0.12 percent $Fe_2O_3$, and about 0.09 percent $SiO_2$. On ignition it loses about 6.0 percent of its weight. It has a surface/mass ratio of 210 $m.^2/g$. It is prepared by calcination of alpha alumina trihydrate and contains a mixture of the transitional aluminas described earlier in this specification.

A flow of nitrogen is maintained through the pressure resistant vessel while it is being charged. Butylene is added to the reaction mixture until a total of 728 parts is added over a period of six minutes. The reaction mixture is heated to 100° C. and kept at that temperature for 48 hours. The mixture is filtered and the filtrate is found to contain 2-sec-butylphenol as the major constituent with minor amounts of 2,6-di-sec-butylphenol.

Example 4

A total of 490 parts of phenol, together with 2.45 parts of a mixed alumina composed of alpha alumina monohydrate, amorphous alumina and small quantities of gamma and theta transitional alumina as a catalyst, is charged to the pressure resistant vessel as described in Example 1. The reaction vessel is heated to 100° C. and pressurized with ethylene. The temperature is then increased slowly to 400° C., the start of the reaction being evidenced by a drop in the ethylene pressure. The reaction is carried out at a pressure of 21-35 atmospheres and at a temperature of about 500° C. An amount of ethylene equivalent to a drop in pressure of 61 atmospheres is reacted with the phenol over a period of one hour. The reaction mass is filtered and the filtrate fractionated to yield mainly a mixture of 2-ethylphenol and 2,6-diethylphenol.

Further good results are obtained with a minimum of reaction time when naphthol-1 is reacted with isobutylene using a transitional alumina catalyst to give 2-tert-butyl-naphthol-1 and also when 2-methoxyphenol is reacted with 2-methylbutene-1 using an eta alumina catalyst to form 2-methoxy-6-(1,1-dimethylpropyl)phenol, or when anthrol-1 is reacted with 2-methylpentene-1 using a chi alumina catalyst to form 2-(1,1-dimethylbutyl)anthrol-1.

Example 5

The catalyst used is an F-3 alumina. This particular granular transitional alumina has essentially the same elemental analysis as the alumina of Example 3. Its loss on ignition is about 7.2 percent by weight, it contains 0.09 percent silica, and its surface area is about 200 $m.^2/g$. It is made by controlled calcination of alpha alumina trihydrate and contains a mixture of transitional aluminas.

A mixture of 300 parts of phenol, 262 parts of cyclohexene and 30 parts of the F-3 alumina are heated in the pressure resistant vessel of Example 1, to 200° C. for 10 hours whereupon alkylation occurs. The reaction mixture is filtered and the filtrate fractionated to yield a mixture of substantial amounts of 2-cyclohexylphenol and 2,6-dicyclohexylphenol. A minor amount of p-cyclohexylphenol is also produced.

Further, good results are obtained with a minimum of reaction time when o-hydroxydiphenyl is reacted with isobutylene using a rho alumina catalyst to produce 2-phenyl-6-tert-butylphenol. Likewise, p-hydroxydiphenyl can be reacted with isobutylene using an alpha alumina monohydrate catalyst to give 2-tert-butyl-4-phenylphenol and 2,6-di-tert-butyl-4-phenylphenol. Also, the reaction between isobutylene and 4,4'-dihydroxydiphenyl, using a theta alumina produces such products as 4,4'-dihydroxy-3-tert-butyldiphenyl, 4,4'-dihydroxy-3,3' - di-tert-butyl-diphenyl, 4,4' - dihydroxy-3,5-di-tert-butyl-diphenyl, 4,4'-dihydroxy-3,3'-di-tert-butyldiphenyl, 4,4'-dihydroxy - 3,3',5-tri-tert-butyldiphenyl, 4,4'-dihydroxy - 3,3',5,5'-tetra-tert-butyldiphenyl. One of the factors that will determine which of the alkylated 4,4'-dihydroxydiphenyl isomers will predominate in the reaction products, is the ratio of olefin to the 4,4'-dihydroxydiphenyl used in the reaction mixture. For example, when 4,4'-di-hydroxydiphenyl is reacted with an excess of isobutylene for a sufficient length of time, a high yield of the 4,4'-dihydroxy-3,3', 5,5'-tetra-tert-butyldiphenyl is obtained.

The process of this invention can also be used to obtain other products with a minimum of reaction time, among which are: 2,4-dimethyl-6-tert-butylphenol which can be obtained by the reaction of 2,4-dimethylphenol with isobutylene using a kappa alumina; 2,6-di-tert-butyl-4-methylphenol which can be obtained by the reaction of p-cresol with isobutylene using a mixture of delta and gamma alumina; 4-(N-amylamino)-2-tert-butylphenol and 4-(N-amylamino)-2,6-di-tert-butylphenol which can be obtained by the reaction of 4-(N-amylamino)phenol with isobutylene using a transitional alumina; 4-(N,N-dibutylamino)-2-tert-butylphenol and 4-(N,N-dibutylamino)-2,6-di-tert-butylphenol which can be obtained by the reaction of 4-(N,N-dibutylamino)phenol with isobutylene using a mixture of transitional aluminas; 2-tert-butyl-4-chlorophenol and 2,6-di-tert-butyl - 4 - chlorophenol which can be obtained by the reaction of p-chlorophenol with isobutylene using a mixture of gamma, delta, eta and theta aluminas; 2-tert-butyl-4-bromophenol and 2,6-di-tert-butyl-4-bromophenol which can be obtained by the reaction of p-bromophenol with isobutylene using a mixture of kappa, chi and rho aluminas; 2-amino-4-halo-6-tert-butylphenol which can be obtained by the reaction of 2-amino-4-halophenol with isobutylene using a mixture of alpha monohydrate, eta and rho aluminas; 2-(N-isopropylamino)-4-halo-6-tert-butylphenol which can be obtained by the reaction of 2-(N-isopropylamino)-4-halophenol with isobutylene using a transitional alumina catalyst; 1,4-dihydroxy-2-tert-butyl benzene and 1,4-dihydroxy-2,5-di-tert-butyl benzene and also the tri- and tetra-substituted benzenes which can be obtained by the reaction of 1,4-dihydroxybenzene with isobutylene using an amorphous alumina catalyst.

Other products which can be obtained with a minimum of reaction time by the use of other unsaturated compounds such as 2-methylbutene-1, 2-ethylbutene-1, 2-methylpentene-1, and the like, as well as other phenols such as 2-(4-hydroxyphenyl)phenol, 2-(2-hydroxyphenyl)phenol, etc., will be apparent to one skilled in the art.

The transitional aluminas can also be treated to impart acidity to them. Such acidic aluminas can also be used to advantage in the process of this invention. The following example illustrates such catalysts.

*Example 6*

One half liter of the KA-101 catalyst as used in Example 1 was treated with 200 ml. of water, 12 ml. of concentrated phosphoric acid, 3 ml. of HF and 0.25 gm. of gold chloride. The catalyst was then ground and dried at 150° C.

The pressure resistant vessel of Example 1 was flushed with nitrogen and charged with 454.0 gms. of phenol, 94.1 gms. of the treated KA-101 catalyst described above and 180 ml. of propylene. The mixture was heated to 280° C. and a pressure of 820 p.s.i.g. at which point reaction started and the pressure dropped to 500 p.s.i.g. in one hour. An additional 220 ml. of propylene was added at 285° C. and 500 p.s.i.g. in 1.5 hours. The mixture was then heated at 295° C. for 2 hours during which time the pressure dropped to 220 p.s.i.g. After cooling, the reaction mass was filtered and the filtrate was analyzed by Vapor Phase Chromatography which revealed a yield of 61.1 percent of 2-isopropyl phenol and 12.3 percent of 2,6-diisopropyl phenol.

Further good results are obtained when 2,4-dimethylphenol is reacted with diisobutylene using a transitional alumina catalyst such as gamma alumina to produce 2,4-dimethyl - 6-(1,1,3,3-tetramethylbutyl)phenol. Likewise, p-cresol can be reacted with diisobutylene using a transitional alumina catalyst to give 4-methyl-2,6-di-(1,1,3,3-tetramethylbutyl)phenol. In like manner 4-(N-butylamino)-phenol can be reacted with diisobutylene using an amorphous alumina catalyst to form 4-(N-butylamino) - 2-(1,1,3,3 - tetramethylbutyl)phenol and 4-(N-butylamino) - 2,6 - di-(1,1,3,3-tetramethylbutyl)phenol. Also diisobutylene can be reacted with a p-halophenol using eta alumina to form 2-(1,1,3,3-tetramethylbutyl)-4-halophenol and 4 - halo - 2,6-di(1,1,3,3-tetramethylbutyl)phenol. Likewise, diisobutylene can be reacted with 4,4'-dihydroxydiphenyl using delta alumina to give products containing 1,2,3- or 4-tert-octyl groups on the phenyl nucleus as, for example, 4,4'-dihydroxy-3,5'-di-(1,1,3,3-tetramethylbutyl)-diphenyl and 4,4'-dihydroxy-3,3',5,5'-(1,1,33-tetramethylbutyl)-diphenyl. Other possible products that can be obtained will be apparent to one skilled in the art.

*Example 7*

A mixture of 30 parts of a beta alumina catalyst 100 parts of phenol and 167 parts of decene-1 are added to a pressure resistant vessel equipped as the pressure resistant vessel of Example 1. The mixture is heated to 300° C. over a 60 minute period and then cooled, filtered and the filtrate fractionated. Obtained in good yield are 2-(1-methylnonyl)phenol and 2,6-di-(1-methylnonyl)phenol.

Both these compounds are good insecticides as well as fugicides, miticides and germicides. They also are good plasticizers and antioxidants for hydrocarbon fuels and lubricating oils.

*Example 8*

A mixture of 188 parts of phenol and 9.4 parts of theta alumina are added along with 210 parts of methallyl methyl ether to the pressure resistant vessel of Example 1. The mixture is heated and the reaction is allowed to proceed in the temperature range of 100–125° C. over a 15 hour period. The reaction mixture is then cooled, filtered and the filtrate fractionated to give a high yield of 2-(1,1-di-methyl-2-methoxyethyl)phenol.

Good results in a minimum of reaction time and with a minimum of separation procedures are also obtained when naphthol-1 is reacted with methallyl ethyl ether using a transitional alumina catalyst to form 2-(1,1-dimethyl-2-ethoxy ethyl naphthol). Likewise, when 3-chlorophenol is reacted with allyl amine using rho alumina the products, 2-(1-methyl-2-aminoethyl)-3-chlorophenol and 2 - (1 - methyl - 2-aminoethyl)-5-chlorophenol are formed. Other products that can be obtained by the practice of this invention will be apparent to one skilled in the art.

In general, the process of this invention can be carried out at temperatures ranging from 100 to about 500° C. and at pressures of from less than 1 atmosphere to about 3000 atmospheres or higher. The optimum temperature and pressure of a particular reaction depends on the reagents that are being reacted and the catalyst or catalysts used. For example, when the unsaturated compound which is to be used for introducing a group onto the aromatic ring of a phenol has at least one hydrogen atom on each of the doubly bonded carbon atoms, we prefer to use temperatures ranging from about 200° C. to about 500° C. and pressures in the range of 1–3000 atmospheres. When alkylating phenols, such as hydroxy-benzenes and hydroxy naphthalenes, with acetylenic and olefinic hydrocarbons such as acetylene, ethylene, propylene, butylene, hexene, decene, cetene, eicosene, and the like, we especially prefer reaction temperatures of from about 150° C. to about 300° C. and reaction pressures of from less than one atmosphere to about 500 atmospheres. However, higher temperatures and pressures can be used. For example, alkylation of phenol with ethylene requires, for best results, a higher pressure and temperature than does alkylation of phenol with propylene, while alkylation with a hydrocarbon such as decene can be conducted at the vapor pressure of system.

Another situation arises when at least one of the doubly-bonded carbon atoms in the unsaturated compound which is used has no hydrogen attached thereto. We find that in this case temperatures ranging from 0 to 500° C. and pressures of from 1 to 3000 atmospheres can be employed. As the temperature is increased, there should be a corresponding increase in the pressure in order to obtain a predominantly ortho substituted product for otherwise, at high temperature and low pressure, a larger amount of para substituted product is obtained. However, except for the limitations that have been noted above, we obtain a good yield of ortho alkyl phenols under any of the general conditions of pressure and temperature combinations within the broad limits of which our process can be carried out as discussed hereinabove.

From the above discussion and the examples cited, it is seen that optimum temperature and pressure for a particular set of reagents and catalysts can be determined by one skilled in the art simply by following the teachings of this invention.

It was stated above that the phenols that can be used in carrying out the process of this invention can be mono- or polynuclear and mono- or polyhydroxy, and that they may or may not have other substituents on the ring, the requirement being that there be a position ortho to the hydroxy group available for substitution. Non-limiting examples of such phenols are phenol, o-cresol, m-cresol, p-cresol, p-chlorophenol, m-chlorophenol, o-chlorophenol, 2,5-dichlorophenol, p-bromophenol, o-nitrophenol, m-nitrophenol, p-nitrophenol, o-cyclohexylphenol, p-cyclohexylphenol, catechol, resorcinol, hydroquinone, pyrogallol, hydroxyhydroquinone, phloroglucinol, o-aminophenol, m-aminophenol, p-aminophenol, guaiacol, anol, eugenol, isoeugenol, saligenin, carvacrol, thymol, o-hydroxyacetophenone, o-hydroxydiphenyl, p-hydroxydiphenyl, m-hydroxyethylbenzoate, p-hydroxymethylbenzoate, naphthol-1, 3-chloronaphthol-1, 6-bromonaphthol-1, 3-nitronaphthol-1, 3-methylnaphthol-1, 8-aminonaphthol-1, anthrol-1, 9-chloroanthrol-1, 3-bromoanthrol-1, 9-aminoanthrol-1, phenanthrol, ar-2-tetralol, and the like.

The unsaturated compounds that can be used to introduce organic groups onto the aromatic nucleus are acetylene and substituted acetylenes such as methyl acetylene, ethyl acetylene, and the like; mono- and non-conjugated polyolefins such as ethylene, propylene, butylene, isobutylene, amylene, isoamylene, 2-methylamylene, hexene, heptene, heptadienes, octene, di-isobutylene, decene, alloocimene, dodecene, hexadecene, octadecene, eicosene, styrene, 2-phenylpropene-1, 3-phenylpropene-1, 2-phenylpropene-1, 2-phenylbutene-1, olefins of from 2-4 carbon atoms; that is ethylene, propylene and α-butylene.

Mixed olefins such as are obtained by polymerizing propylenes or butylenes by known methods, having from about 8 to about 12 carbon atoms, can also be used as well as mixtures of other olefins. In addition, certain substituted olefins, (unsaturated organic compounds), can be used. Non-limiting examples of such substituted olefins are: vinylchloride, propargyl ethyl ether, vinyl ethyl ether, divinyl ether, methallyl ethyl ether, dimethallyl ether, methallyl phenyl ether, dihydropyran, propenyl acetate, methyl-ββ-methyl crotonate, pentene-4-ol-1, 4-methylpentene-4-ol-2, hexene-5-ol-1, decene-9-ol-1, dodecene-11-ol-1, cetene-15-ol-1, eicosene-19-ol-1, methyloleate, ethyloleate, ethyllinoleate, methallylamine, crotonylamine, 5-aminopentene-1, and the like.

Non-limiting examples of products that can be obtained by the process of this invention in addition to those given hereinabove are: 2-hydroxy styrene and 1,1-bis(2-hydroxyphenyl)ethane, obtained by the reaction of phenol with acetylene using a transitional alumina; 3-methyl-2-ethylphenol, 3-methyl-6-ethylphenol and 3-methyl-2,6-diethylphenol, obtained by the reaction of 3-methyl-phenol with ethylene using a delta alumina; 3-methyl-2-isopropylphenol, 3-methyl-6-isopropylphenol, and 3-methyl-2,6-diisopropylphenol obtained by the reaction of 3-methylphenol with propylene using an amorphous alumina; 2-ethyl-6-tert-butylphenol, obtained by the reaction of phenol with ethylene using an alpha alumina monohydrate catalyst and then reacting the 2-ethylphenol obtained in this manner with isobutylene using an eta alumina catalyst; 2-isopropyl-6-tert-butylphenol obtained by the reaction of phenol with propylene using a mixture of eta and chi alumina; to produce 2-isopropylphenol and then reacting that product with isobutylene using the same or a different transitional alumina; 2-(2-eicosyl) phenol obtained by the reaction of phenol with eicosene-1 using a mixture of kappa and alpha monohydrate aluminas; 2-isopropylnaphthol-1 obtained by the reaction of naphthol with propylene using an eta alumina catalyst; 2-decylnaphthol-1 obtained by the reaction of naphthol-1 with decene-1 using a mixture of gamma, eta, kappa and rho aluminas; 2-tert-butylanthrol-1 obtained by the reaction of anthrol-1 with isobutylene using a transitional alumina catalyst 3-chloro-2-isopropylphenol, 3-chloro-5-isopropylphenol and 3-chloro-2,6-diisopropylphenol obtained by the reaction of 3-chlorophenol with propylene using a mixture of amorphous alumina and alpha alumina monohydrate; 2-(1-methyl-3-hydroxyethyl)phenol obtained by the reaction of phenol with pentene 4-ol-1 using a mixture of eta and gamma aluminas; 2-(1,1-dimethyl-2-ethoxyethyl)phenol obtained by the reaction of phenol with methallyl ethyl ether using a transitional alumina; di-2-(2-methyl-2-hydroxy phenyl)propyl ether obtained by the reaction of phenol with dimethallyl ether using an amorphous alumina catalyst; 2-(β-methyl-β-hydroxyphenyl) butyric acid, methyl ester, obtained by the reaction of phenol with methyl-β-methyl crotonate using an alpha alumina monohydrate catalyst; 2-(1,1-dimethyl-2-aminoethyl)phenol obtained by the reaction of phenol with methallyl amine using a mixture of gamma and alpha monohydrate aluminas;

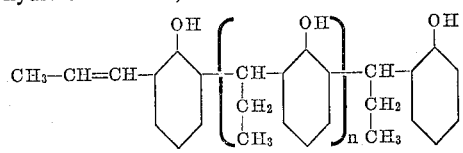

obtained by reacting anol using a transitional alumina.

In carrying out the process of this invention the reagents can often be reacted without the presence of any diluent. However, it is within the scope of our invention to conduct the process of this invention with either or both of our reactants dissolved in one or more solvents or a mixture of solvents. The solvent can be either liquid, solid or gaseous, depending primarily on the state of the reactant which is to be diluted at the time of introduction into the reaction vessel or zone. The solvent should be one which is inert to the components including the catalyst under the conditions of the reaction. Paraffins, cycloparaffins, aromatic hydrocarbons, and inert gases, and the like, are examples of suitable solvent types which may be compatible with one or more of the reagents that can be used in practicing our invention. Specific examples of solvents include n-octane, isooctane, cyclohexane, benzene, alkyl benzenes, hydrogen, nitrogen, argon, and the like. Also, one of the reacting components can be employed as a solvent, as for example, an excess of phenol may serve as a suitable diluent.

In the commercial production of the compounds of this invention it is particularly attractive to conduct the process in a continuous manner. This can be done by a variety of techniques such as passing the reactants together with the catalyst, either substantially pure or admixed with an inert carrier, through a reaction zone. The product stream can be filtered and purified by distillation in a continuous fractionation column. The continuous method for the production of the compounds of our invention can be carried out either in a "once through" manner or with recycling of reactants and products. In continuous and batch modifications of our invention, the reactants can be diluted with inert gases such as propane, ethane, methane, nitrogen, helium, neon and the like as well as with other gaseous, liquid or solid diluents or solvents of the kind described hereinabove.

The compounds that can be made by the process of this invention have a variety of uses such as monomers for phenolic resins, detergent intermediates, germicides, polymerization inhibitors, antioxidants, intermediates for dye syntheses and the like. As specific examples, o-tert-amylphenol is an outstanding ingredient for marine antifouling paints and as an antiskinning agent for paints, and varnishes, and 2,6-di-tert-butylphenol and 2,6-di-isopropylphenol are very good antioxidants, to mention but a few of the many useful phenols possessing groups in the ortho positions.

It has been noted that one of the advantages of the process of this invention is that a higher proportion of mono-ortho alkylated product is obtained than with previous processes. The following example illustrates this advantage.

*Example 9*

The KA-101 activated transitional alumina described in Example 1 was used as the catalyst and 100 parts of it were charged, along with 470.6 parts of phenol and 168 parts of isobutylene to the pressure resistant vessel of Example 1. The vessel was heated to a temperature of 160° C. in 88 minutes with a pressure of 400 p.s.i.g. and an additional 168 parts of isobutylene were added. The vessel was then heated to a temperature of 192° C. and 430 p.s.i.g. in 34 minutes and maintained at 192–194° C. and 320–480 p.s.i.g. for an additional 109 minutes during which time an additional 98 parts of isobutylene were added. The vessel was cooled and vented and the product filtered. The filtrate was analyzed by Vapor Phase Chromatography and revealed a yield ratio of 2-tert-butyl phenol to 2,6-di-tert-butyl phenol of 161:1.

In comparison, Example VI of U.S. Patent 2,831,898, noted previously, discloses that when alumina phenoxide is used as a catalyst there is obtained a yield ratio of 2-tert-butylphenol to 2,6-di-tert-butylphenol of only 4.15:1.

I claim:

1. In a process for selectively introducing a hydrocarbon group onto a nuclear ring of a phenol, said process comprising reacting a phenol bearing at least one ortho hydrogen atom with an olefin, said process being carried out at a temperature of from 100 to 500° C., the improvement which comprises conducting said process in the presence of a mixture of from about 10 to 90 percent α-alumina-monohydrate and from about 10 to 90 percent of eta-alumina.

2. The process of claim 1 wherein said hydrocarbon is a beta-hydrogen alpha olefin having from 2 to 4 carbon atoms.

3. The process of claim 2 wherein said olefin is selected from the group consisting of propylene and α-butylene.

4. The process of claim 1 carried out at a temperature of from 150–300° C.

5. The process of claim 1 wherein said olefin is propylene.

6. The process of claim 1 wherein said olefin is n-butene.

References Cited

UNITED STATES PATENTS

| | | | |
|---|---|---|---|
| 2,448,942 | 9/1948 | Winkler et al. | 260—624 |
| 2,939,890 | 6/1960 | Hervert et al. | 252—463 |
| 3,131,230 | 4/1964 | Hervert et al. | 260—671 |
| 3,188,174 | 6/1965 | Kehl et al. | 252—463 |
| 3,290,389 | 12/1966 | Hahn | 260—624 |
| 3,131,230 | 4/1964 | Hervert et al. | 260—671 |

FOREIGN PATENTS

| | | |
|---|---|---|
| 612,901 | 2/1962 | Belgium. |
| 925,819 | 5/1963 | Great Britain. |

LEON ZITVER, *Primary Examiner.*

W. B. LONE, *Assistant Examiner.*

UNITED STATES PATENT OFFICE
CERTIFICATE OF CORRECTION

Patent No. 3,367,981                                February 6, 1968

John P. Napolitano

It is hereby certified that error appears in the above numbered patent requiring correction and that the said Letters Patent should read as corrected below.

Column 4, line 53, for "$R_2$" read -- $R'$ --.

Signed and sealed this 22nd day of April 1969.

(SEAL)
Attest:

Edward M. Fletcher, Jr.                                EDWARD J. BRENNER

Attesting Officer                                           Commissioner of Patents